United States Patent
Glushko et al.

[11] Patent Number: 6,009,065
[45] Date of Patent: Dec. 28, 1999

[54] OPTICAL PICKUP FOR 3-D DATA STORAGE READING FROM THE MULTILAYER FLUORESCENT OPTICAL DISK

[75] Inventors: Boris A. Glushko, Ashdod, Israel; Eugene B. Levich, New York, N.Y.

[73] Assignee: OMD Optical Memory Devices Ltd., Rehovot, Israel

[21] Appl. No.: 08/985,189

[22] Filed: Dec. 4, 1997

Related U.S. Application Data

[60] Provisional application No. 60/032,603, Dec. 5, 1996.

[51] Int. Cl.$^6$ ............................... G11B 7/00; G11B 3/74
[52] U.S. Cl. ............................... 369/112; 369/94
[58] Field of Search ................. 369/30, 32, 43, 369/44.14, 47, 54, 58, 99, 100, 108, 112, 117, 118, 120, 121, 94

[56] References Cited

U.S. PATENT DOCUMENTS

| | | |
|---|---|---|
| 3,013,467 | 12/1961 | Minsky . |
| 4,026,869 | 5/1977 | Evens et al. . |
| 4,036,805 | 7/1977 | Tsujimoto et al. . |
| 4,090,031 | 5/1978 | Russell . |
| 4,864,536 | 9/1989 | Lindmayer . |
| 5,113,387 | 5/1992 | Goldmsith et al. . |
| 5,177,227 | 1/1993 | Fischer et al. . |
| 5,208,354 | 5/1993 | Fischer et al. . |
| 5,268,862 | 12/1993 | Rentzepis . |
| 5,278,816 | 1/1994 | Russell . |
| 5,325,324 | 6/1994 | Rentzepis et al. . |
| 5,407,885 | 4/1995 | Fischer et al. . |

OTHER PUBLICATIONS

Strickler, J.H. et al., *Optics Letter*, vol. 16, No. 22, 1781, (1991).
Ueki, H. et al., *Applied Optics*, vol. 35, No. 14, 2457, (1996).
Kawata, Y. et al., *Applied Optics*, vol. 35, No. 14, 2466 (1996).
Gunshor, Robert L. et al., *Scientific American*, 34 (196).
Parthenopoulos, Dimitri A. et al., *Science*, vol. 245, 843, (1989).
Parthenopoulos, Dimitri A. et al., "Three–Dimensional . . . Memory," J. Am. Chem. Soc., 1994, 116, 1101–1105 (1994).
Malkin, J. et al., "Photochromism . . . Naphthacenequinones," J. Am. Chem. Soc., 1994, 116, 1101–1105 (1994).
Sokolyuk, N.T. et al., "Naphthacenequinones: Synthesis and Properties," Russian Chem. Review 61(11), 1005–1024 (1993).
Gritsan, N.P. et al., "Kinetic Study of . . . 1–alkyl–9, 10–anthra–quinones," Russian J. of Phys. Chem. 64(11), 1660–1663 (1990).

(List continued on next page.)

*Primary Examiner*—Paul W. Huber
*Attorney, Agent, or Firm*—Blank Rome Comisky & McCauley LLP

[57] ABSTRACT

An optical pickup providing the 3-D reading of the binary optical information from the multilayer fluorescent disk by means of fluorescent sites excitation, is described. The 2-D information at the separate layer is recorded by chemical transformation of the photosensitive material from one stable molecular form A (non fluorescent) to other stable molecular form B (fluorescent) via UV light illumination.

The present invention particularly concerns the methods and apparatus to read the stored memory from the read only 3-D optical memory and includes: (i) only one, focused to the desired layer, reading laser beam, which induces the fluorescence in the whole volume confined within conical surface of focused beam, (ii) active medium which posses the fluorescing properties and is organized in a form of multilayer optical disc, (iii) detection of fluorescence at the wavelength different from the excitation wavelength, (iv) spectral, spatial and electronic filtration of the detected signal in order to extract signal from the noise fluorescence coming from all out-of-focus layers. Utilization of dichroic mirror and/or filter in the optical pickup prevents the photo diode from the reading laser radiation.

19 Claims, 7 Drawing Sheets

OTHER PUBLICATIONS

Gritsan, N.P. et al., "Mechanism of Photochromic . . . Derivatives," J. Photochemistry and Photobiology, A: Chemistry, 52 (1990) 137–156.

Gritsan, Nina P. et al., "Experimental and Theoretical . . . 1–Methylanthraquinone," J. Am. Chem. Soc. 1991, 113, 9615–9620.

Irie, Masahiro et al. "Thermally Irreversible . . . Derivatives," J. org. Chem., vol. 53, No. 4, 1988, 803–808.

Nakamura, Shinichiro et al., "Thermally Irreversible . . . Study," J. Org. Chem. 1988, 53, 6136–6138.

Irie, M., "Design and Synthesis of Photochromic Memory Media," 1994.

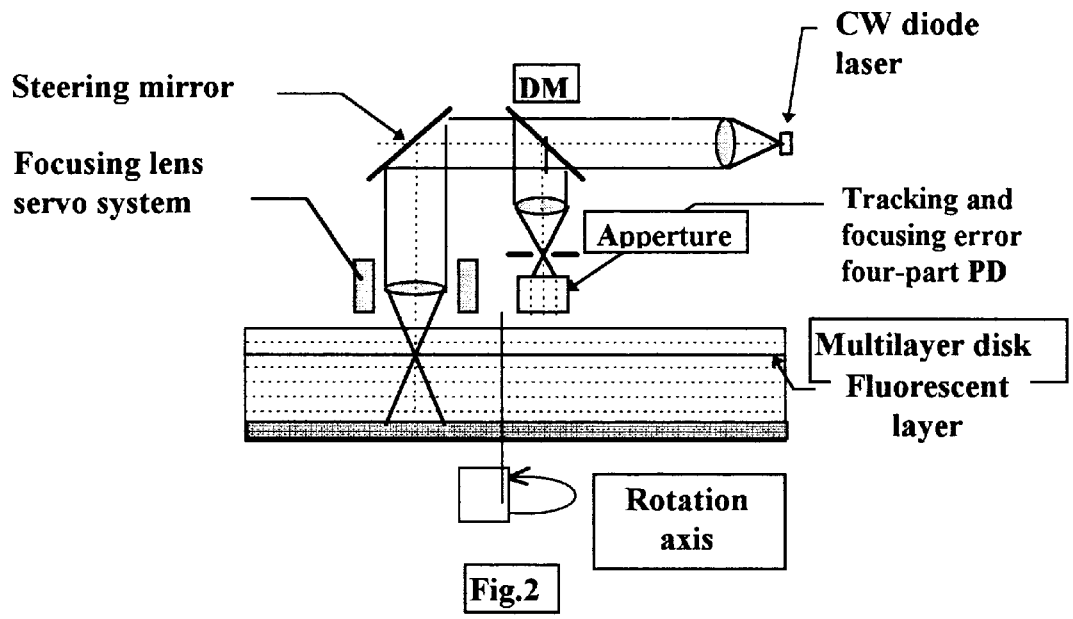
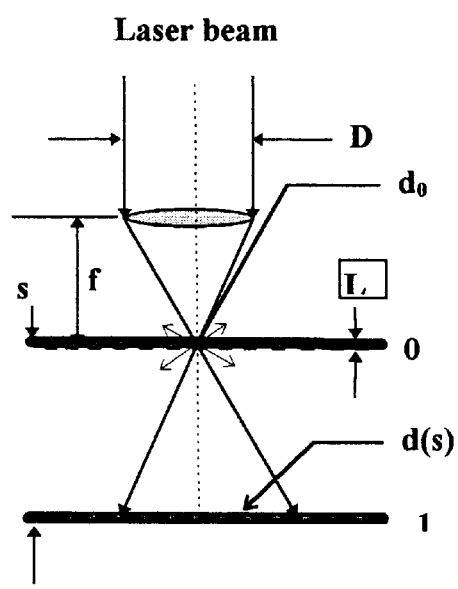
Fig 3.a

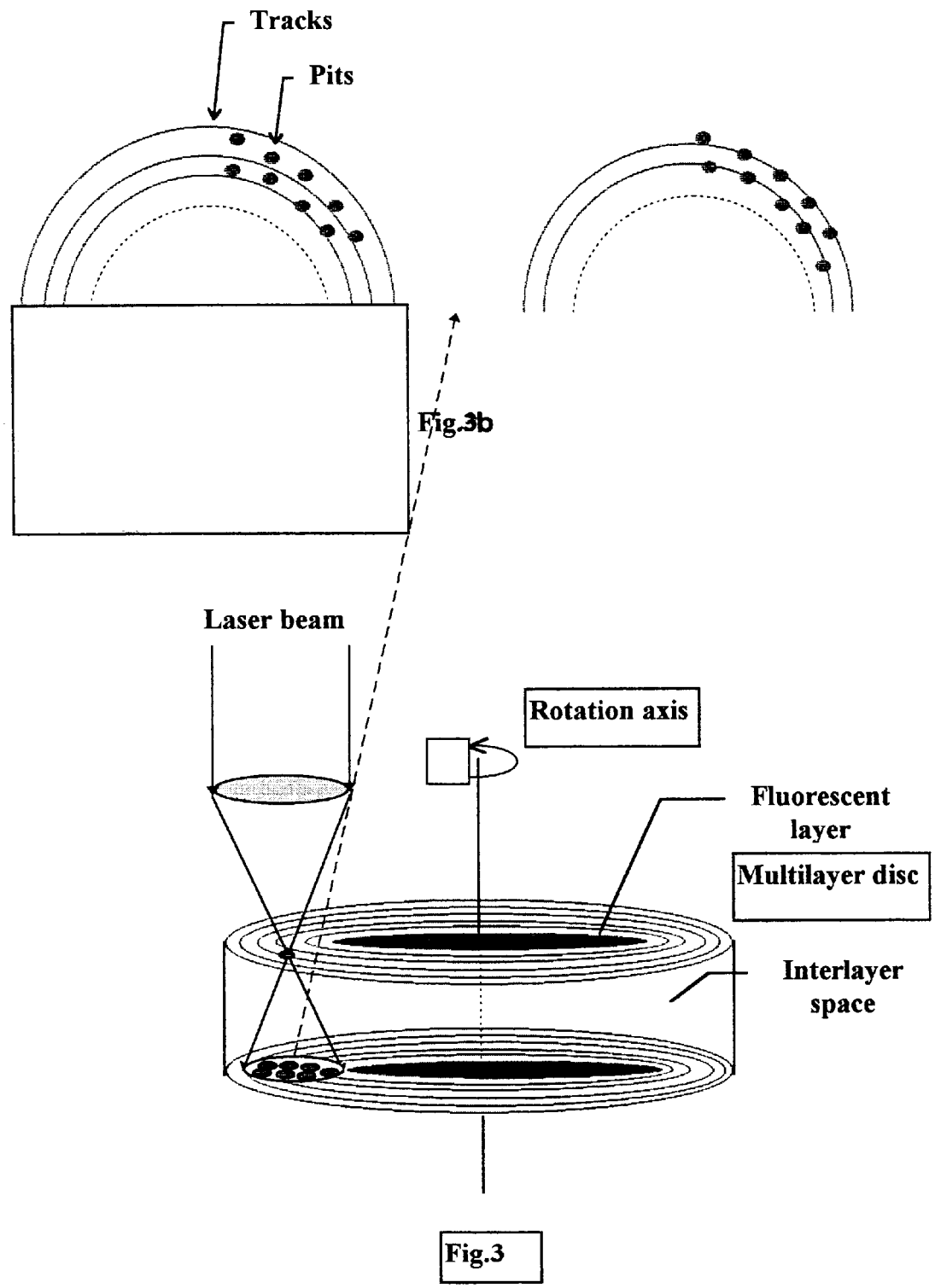

OPTICAL PICKUP FOR 3-D DATA STORAGE READING FROM THE MULTILAYER FLUORESCENT OPTICAL DISK

This a Continuation-in-Part of Provisional Application Serial No. 60/032,603, filed on Dec. 5, 1996, the subject matter of which is incorporated herein by reference in its entirety.

FIELD OF INVENTION

The present invention generally concerns the principles of reading the information from multilayer fluorescent optical media and design of reading device which can realize this function.

The present invention particularly concerns the methods and apparatus to read the stored memory from the read only 3-D optical memory (CD ROM) and includes: (I) only one, focused to the desired layer, reading laser beam, which induces the fluorescence in the whole volume confined within conical surface of focused beam, (ii) active medium which posses the fluorescing properties and is organized in a form of multilayer optical disc.

The present invention concerns the special photosensitive material utilization to record and replicate the 3-D read only optical disks.

BACKGROUND OF THE INVENTION

There is a growing demand in a cheap and reliable carrier of digital information for computers, video systems, multimedia, etc. This carrier should have a storage capacity in excess of $10^{10}$ bytes, fast access time, high transfer rate and long term stability.

Digital information is recorded at high density (about $10^8$ bytes per square inch) using optical and magnetic methods. Optical and magneto-optical disks, magnetic disks and magnetic tapes are most popular carriers of digital information. Optical methods have advantages over magnetic ones because of less restricted requirements to the components and environment. Parallel writing of information at mass production is another advantage of the optical memory. The information is usually written as local variations of thickness, refractive index or absorption coefficient of the media.

The optical disk capacity is diffraction limited by a value of (disk area $\lambda^{-2}$) bits because only one binary value is stored in a diffraction limited pixel. Quadrupled capacity can be gained using "super resolution" at fractions of wavelengths. High density of information is received when 3–5 bits are stored in a single pit as a small variation of the pit length around diffraction limit. Precision optical, mechanical and electronic components as well as high quality media are required to realize this method.

The stacks of two or more disks is a way to increase the capacity of digital data carrier. Some problems of disks stack methods are listed below. They are the multiple reflections between the reflective surfaces, power losses at each information plane during the propagation of reading and reflected beams to and from the internal layers, interference of the light reflected from different layers, and beam distortions due to the optical aberrations. The aberrations appear when the optical path within the storage media is changed to read different information planes. High quality optical adhesives are required to assemble stack of disks, having on aberrations, bubbles, separations, inclusions as well as no mechanical, thermal and chemical impact on the disks. The information capacity of multi stack disks is limited in practice around $10^{10}$ bytes. These discs are composed of 2 structures of 2–3 information layers, the structures are attached together by back sides to double capacity of the disk to the value around $2 \cdot 10^{10}$ bytes.

Three dimensional (3-D) recording can dramatically increase the capacity of storage device. An optical memory enables to store the binary-stated information into a storage medium at very high density, each binary bit occupying a space only about wavelength in diameter, $\lambda^{-3} \sim 10^{12}$ bits/cm$^3$. When practical limitations are taken into account it reduced to $10^{10}$–$10^{11}$ bits/cm$^3$.

The 3-D writing and reading was reported (J. H. Stricler, W. W. Webb, Optics Lett., 16, 1970, (1991); H. Ueki, Y. Kawata, S. Kawata, Applied Optics, 35, 2457, (1996); Y. KAWATA, R. Yuskaitis, T. Tanaka, T. Wilson, S. KAWATA, Applied Optics, 35, 2466, (1996);), using local changes of refractive index of the optical media. These local variations of refractive index result in the birefringence and variations of polarization of the reading beam transmitted thought the media. The variations were measured and can be interpreted as a binary code. The signal is very weak requiring high power laser and highly sensitive detectors.

The 3-D regular structure of the information carrier acts as a material at a macro scale introducing the non informative depolarization and defocusing of the transmitted beam.

The variations of the refractive index of the media introduce the phase modulation located in the adjacent layers, diffraction and power losses. The measurement of the transmitted beam is conducted requiring two optical head (transmitting and receiving) from both sides of the carrier. This optical solution is very complicated and expensive requiring simultaneous alignment of the heads to a diffraction limited spot, especially taking into account the variation of the required optical path, medium inhomogeniouty, and carrier/heads movement perturbations. The data recording is possible only by the laser utilization—thus it does not allow to implement cheap replication method, like mask lithography.

Solidification/polymerization process results in non-controllable material deformation during the recording procedure. Afterwards, the volume induced strengthens may lead to the recorded site movements and information distortion. Thus, all mentioned above drawbacks will put obstacles in the way of converting this approach to be realized into the practical 3D-memory device.

First device for reading the information from the multilayer fluorescent medium was suggested by Russell, U.S. Pat. Nos. 4,090,031 and 5,278,816, and was based on utilization of optical data layers with different color dyes or different fluorescent materials and selectively positioning of corresponding color filters in front of the light detector.

Further, the fluorescent 3-D memory and apparatus for retrieving the information was suggested by D. A. Pathenopoulos and R. M. Rentzepis, Science, 245,843, (1989). [5]., R. M. Rentzepis, U.S. Pat. No. 5,268,862. The active material contains the photo chromic molecules having two isomeric forms. First isomeric form "A" is not fluorescent, it has absorption bands for UV radiation, and it is transferred to the second form "B" under the two visible photon absorption. The form B absorbs the two photon of reading radiation and fluoresces in the infrared range.

The information is retrieved from the medium by a two-photon absorption process, and corresponding fluorescence at the point where two focused beams are crossed at the region having dimensions of $\lambda^{-3}$. Each beam should be formed by a picosecond or femtosecond pulse of light to provide the intensity required for both writing and reading processes. This also means that two pulses should overlap in a time domain. The Rentzepis patent [6], was the first implementing the photo chrome materials for 3-D optical memory, and describing the principles and methods of two-photon rewritable 3-D apparatus.

Accordingly, this approach has also a series of drawbacks, which will hardly permit it to be practically realized. First, the two-photon approach requires extremely high intensity laser pulses, $I~10^{12}-10^{13}$ W/cm$^2$, which in turn requires the femtosecond pulse width Ti:Saphhire lasers. Second, the $\mu$m-sized intersection of two focused laser beam required for 3-D reading would be very difficult or even impossible for practical realization. Third, the reliable, stable photochromic material which may withstand multiple writing/erasing/reading cycles at a room temperature and posses the optical properties compatible with the existed miniature (diode) laser sources does not yet exist. Another problem is a long time required for writing of the information into the disk. The required time is about $10^5$ sec, if optimistic information writing rate is $10^6$ bits/sec. This makes the described solution to be very expensive even for the mass production. Thus, all mentioned problems make the described method impractical for optical memory device.

There are many different physical principles based on transmission, holography, polarization e.t.c. for recording and reading the optical information, but only two of them based on the reflectivity and fluorescence provide simple, convenient and reliable optical pick-up, where the same objective lens is used for both focusing the incoming light to the layer and collecting the out coming light for detection.

The 3-D optical data reading by one focused laser beam is inevitably followed by fluorescence of a large number of fluorescent cells from non addressed layers confined within the conical surface of the focused laser beam. There are several main drawbacks typical for all existed or described in a number of patents optical apparatus to readout from 3-D or multilayer disk structure:

1. Different intensity of reading laser at different information layers.
2. Different detected signal value coming from different information layers.
3. Strong noise from non addressed layers due to scattering and/or multiple reflection.
4. Dramatic reduction of Signal-to-Noise ratio.
5. Reading beam quality distortion associated with non uniform, refractive index distribution in a thick medium.
6. Spherical aberrations associated with thick medium and variable focus depth requirement.

The obvious disadvantage of the fluorescent principle is low coupling efficiency: while reflected signal value can easily reach 50–80% of incident light, the fluorescence light which is collected by the lens with NA=0.6 can not overcome 10% of incident light. Usually it is much less taking into account the pit absorption rate and fluorescence quantum efficiency of material. However this situation is dramatically changed when the multiple optical data layer system is considered. It would be demonstrated later that even for three data layer disc the detected signal value from reflective and fluorescent media becomes the same ~1% of incident light power. While the reflectivity signal will be completely lost due to the multiple reflection, and unavoidable attenuation during it's propagation through the reflective layers, the fluorescence output can be made completely free of noise.

SUMMARY OF THE INVENTION

The present invention has been made in a view of the above circumstances and has an object to provide the principles of reading the information from multilayer fluorescent recording optical media and design of optical information reproducing apparatus which can realize this function.

The present invention particularly concerns (1) only one focused to the diffraction-limited spot size reading laser beam, (2) optical as well as electronic for selective detection of single bit information from the addressed layer and separation from the noise coming from all non addressed layers, which includes
  (i) confocal aperture in front of detector in order to discriminate the background noise coming from non addressed layers
  (ii) filter or dichroic mirror in front of detector for detection of fluorescence at the wavelength different from the excitation wavelength,
  (iii) electronic signal filtration means to cut down the low frequency modulated component associated with noise coming from non addressed layers, (3) optical means to provide the auto tracking and auto focusing error correction system which is suitable for non reflective, transparent fluorescent media, which based on fluorescence signal from continues tracks or fluorescent cells and photo diode array (4-section photo diode).

In order to achieve all these objects, specially designed optical information recording medium has been developed and described elsewhere (U.S. Ser. No. 60/032,521—Patent pending file): (1) recording media in a form of multilayer optical disc, with active layers possessing the fluorescing properties, are separated by space transparent layers; (2) all data layers are made of the same fluorescent material, and are substantially transparent for reading light and completely transparent for fluorescent light; and (3) the area occupied by fluorescent cells on the data surface does not exceed 10–20% of whole data area and absorption in the fluorescent pit does not exceed 10–20%.

The present invention provides the method and apparatus for multilayer optical data storage reading based on fluorescence signal detection from the media containing the active fluorescent material. The fluorescence process is induced by only one reading laser beam focused into the 3-D medium organized in a form of multilayer optical disc, where thin fluorescent layers with the information recorded as a sequence of fluorescent and non fluorescent cells are separated by thick space transparent layers, whose purpose is to prevent the information distortion in the recording process and to discriminate signal from noise in the reading process. The space layers should have strong absorption in the UV range and be completely transparent for both reading and fluorescence wavelengths.

Further, the invention provides the apparatus for multilayer optical data storage reading, where the reading laser intensity as well as the readout signal have substantially the same value independent on the position in depth of the data layer being readout. Another words such a disk structure provides the access to the desired layer without substantial aberrations, scattering, and attenuation of reading beam.

Furthermore, the invention provides the electronic means to separate the signal detected by the photo diode into the high and low frequency components, where high frequency component represents the data signal from the in-focus layer, and low frequency part is responsible for background noise coming from all out-of-focus layers.

Further, the invention provides the pinhole aperture confocally adjusted to the laser beam focus position on the fluorescent layer placed in front of detector, which reduces substantially the fluorescent light coming from non addressed layers Further, the invention provides the means for spectral filtration of the detected light, in order to avoid the laser radiation reflected and back scattered at the multilayer disc structure to reach the detector.

Further, the present invention provides the optical means to achieve the auto tracking and auto focusing error correction system which is suitable for transparent fluorescent media and is based on the fluorescence signal coming from either continues fluorescent tracks or from fluorescent cells. The invented device includes the servo system which drives the objective lens and steering mirror to compensate the focusing and tracking errors by the auto tracking and auto focusing feedback signals from the photo diode array (4-section photo diode). It also provides the realignment of objective lens focus from one layer to other.

For successful operation of the auto focusing/auto tracking system the two types of track and cells recording format is suggested. In the first scheme the tracks are recorded at the layer surface in a form of continuous fluorescent lines and the information cells are placed between the tracks. In the second scheme the information cells are recorded exactly on the track lines.

BRIEF DESCRIPTION OF THE DRAWINGS

FIG. 2 is another drawing of optical pickup with confocal aperture in front of detector.

FIGS. 3a,b is the enlarged cross-section of the focused laser beam with the multilayer disc structure. f—objective lens focus, s—distance between active layers, L—layer thickness, $d_0$—focused beam spot size, d(s)—beam spot size at the adjacent layer.

DETAILED DESCRIPTION OF THE PREFERRED EMBODIMENTS

Figure 1:
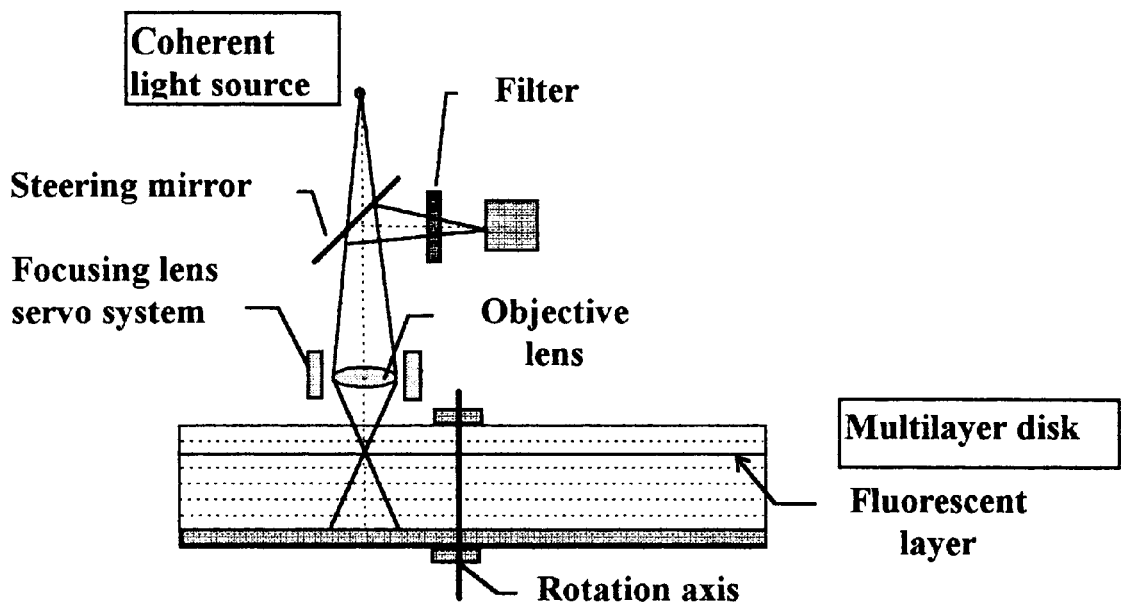
FIG. 1 is a drawing of optical pickup for multilayer disc reading.

When the photosensitive medium is illuminated by a proper wavelength light the chemical conversion from the non fluorescent form A to the fluorescent form B occurs. This conversion can be considered as a process of optical information recording and storage. The optical information can be written either by stepwise layer by layer data recording by direct one beam one-photon absorption of light at 400–440 nm, or by one beam two-photon absorption at 800–880 nm and chemical conversion to the form B.

The form B being illuminated by another, reading wavelength at 620–680 nm will fluorescence in the region 670–750 nm. This fluorescence from the desired point in a 3D-memory optical disc can be considered as a reading process of a stored binary information. The confinement of the excitation volume is provided: in the layer plane-by the diffraction-limited spot size of the focused reading laser beam; in depth-by layer thickness and corresponding laser parameter. The written form B is transparent for the writing laser radiation, while the form A does not absorb the reading laser radiation.

Principal realization of the optical pickup for reading from the 3-D memory is based on the specially organized multilayer disc and the filtration methods allowing to extract the signal from the single pit placed at the laser focus from huge background noise coming from whole excitation volume, FIG. 3.

The amount of the fluorescence light being coupled by the objective lens and delivered to the detection system is determined by it's the numerical aperture $$\eta_{coup}=(NA/2)^2\approx 0.09; \text{ (for } NA=0.6); \tag{1}$$

The fluorescence power obtained by illuminating the written cell of form B with size $d_0 \times d_0 \times l$ is determined by the reading laser power $P_r$, $\alpha_b$—absorption coefficient of molecules in the form B at the excitation wavelength, and $q_f$—fluorescence quantum yield.

$$S_f = P_r \alpha_b l q_f; \tag{2}$$

Thus the expected photo diode signal is $$S_{PD} = \eta_{coup} S_f; \tag{3}$$

and is related to the fact that the written cells $d_0=0.5$ $\mu$m cover only 0.1 part of whole layer area. Suppose we have the multilayer disc with M=100 layers, and l=1–2 $\mu$m active layer thickness. Let us estimate the optimal value of the optical density $\alpha_b l$ of written information, which on the one hand should be small enough to allow the light to reach the last active layer, and on the other hand should be large enough to absorb reasonable amount of light and provide sufficient fluorescence signal. For the beam propagating through the multilayer structure the absorption process is not uniform. The beam size at any layer situated out of focus is large and covers large surface part with some distribution of written and empty points. Therefore the optical density and correspondingly the absorption of out-of-focus layer is $$D'=(d_0/\Delta)^2 \alpha_b l \sim 0.1 \alpha_b l; \tag{4}$$

where $\Delta$ is a track pitch and $k=(d_0/\Delta)^2$—is a filling factor. The filling factor is the ratio of area occupied by fluorescent cells with respect to whole layer area. The optical density for the layer situated exactly at the focus is $D=\alpha_b l$. Therefore, the multilayer disc optical density should be $$D+D'=M(d_0/\Delta)^2 \alpha_b l \sim 10 \alpha_b l; \tag{5}$$

Thus, the maximal absorption coefficient allowed by multilayer structure is $$\alpha_b = 5 \cdot 10^2 \text{ cm}^{-1}; \quad (6)$$

On the other hand the absorption coefficient of molecules in a form B is determined by the written molecular density $N_B$, or concentration $C_B$ and extinction coefficient $\Sigma_B$ ($N_B = C_B \cdot N_0 10^{-3}$—where $N_0 = 6 \cdot 10^{23}$ mol$^{-1}$ is the Avogadro number) and absorption cross-section $\sigma_b$.

$$\alpha_b = \Sigma_B C_B = \sigma_b N_B; \quad (7)$$

The written molecular density/concentration is a function of write laser power/intensity, $\alpha_a$—absorption coefficient for a form A molecules. The number of photons absorbed in a focus of the diffraction—limited spot size $d_0$ and active layer thickness 1 is ($q_a$—quantum yield of chemical transition A→B)

$$n_{ph} = P w \alpha_a 1 t_w / \hbar \overline{\omega}_w; \quad (8)$$

The molecular density of the form B is consequently $$N_B = q_a n_{ph} = q_a P w \alpha_a t_w / S \hbar \overline{\omega}_w = q_a J_w \alpha_a / \hbar \overline{\omega}_w; \quad (9)$$

where $P_w$, $t_w$, $J_w$, $\hbar \overline{\omega}_w$—are the writing laser power, pulse width, energy flux per pulse and photon energy, $S = \pi d_0^2 / 4$-focused beam cross-section.

Typical extinction coefficient for the photosensitive/photo chromic material is $\Sigma_{A,B} \sim 10^4$ 1 mol/·cm. The maximal concentration of active material in a form B can be obtained from the Eq.(7).

$$C_B = \alpha_b / \Sigma_B = 5 \cdot 10^{-2} \text{ mol/l} = 5 \cdot 10^{-5} \text{ mol/cm}^3;$$
$$N_B N_0 C_B = 3 \cdot 10^{19} \text{ cm}^{-3}; \quad (10)$$

Typical concentration for molecules in a form A is $C_A = 0.1$, thus $N_A = 6 \cdot 10^{19}$ cm$^{-3}$. In order to estimate the writing laser power required to create such density of molecules in a form B, one should consider the Eq.(9, 10). Substituting the value of $N_B$ and using the following parameters, $q_a = 0.2$, $t_w = 10^{-6}$ s, $\hbar \overline{\omega}_w = 3 \cdot 10^{-19}$ J, one obtains $$P_W = N_B S \hbar \overline{\omega}_w / q_a \alpha_a t_w = 1 \text{ mW}; \quad (11)$$

Thus, the writing laser power about 1 mw is enough to create the maximal optical density allowed by the multilayer disc structure.

This consideration demonstrates the unique sensitivity of a new technique for optical data storage, based on the fluorescence of the written cells under the reading laser beam illumination. The properties of the photochromic materials used for such purposes allow to utilize the CW diode lasers for both writing and reading procedures. Concluding this consideration we included in a Table 1 all parameters specifying the material as well as writing/reading laser properties.

TABLE 1

| Irreversible photosensitive material for 3-D CD ROM disc. | | Writing laser parameters | Reading laser parameters |
|---|---|---|---|
| $\Sigma_A = 10^4$ ltr/mol cm | $\Sigma_B = 10^4$ ltr/mol cm | $P_W = 1$ mW | $P_r = 0.1$ mW |
| $\sigma_a = 1.6 \cdot 10^{-17}$ cm$^2$ | $\sigma_a = 1.6 \cdot 10^{-17}$ cm$^2$ | $\lambda_w = 440$ nm | $\lambda_r = 650$ nm |
| $\alpha_a = 1000$ cm$^{-1}$ | $\alpha_b = 500$ cm$^{-1}$ | $t_w = 10^{-6}$ s | $t_r = 10^{-6}$ s |
| $N_A = 6 \cdot 10^{19}$ cm$^{-3}$ | $N_B = 3 \cdot 10^{19}$ cm$^{-3}$ | $d_0 = 0.5$ μm | $d_0 = 0.7$ μm |
| $C_A = 0.1$ mol/ltr | $C_B = 0.05$ mol/ltr | NA = 0.5 | NA = 0.5 |
| $q_a = 0.2$ | $q_a = 0.5$ | | $\eta_{ltr} = 0.01$ |
| Number of layers | 100 | | $S_f = 10^{-5}$ W |
| Layer thickness | 2 μm | | $S_{PD} = 10^{-7}$ W |

Figure 4:
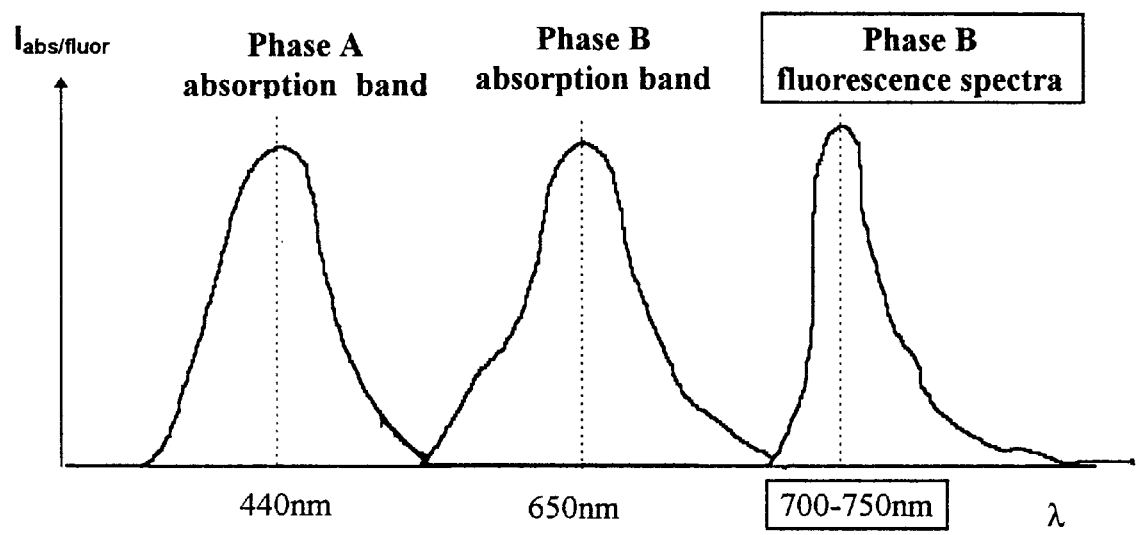
FIG. 4 is the absorption and fluorescence spectra of photosensitive material inserted into the transparent polymer. The photo induced chemical transition from phase A to phase B represents the writing process. The fluorescence of the phase B illuminated by readout laser beam represents the reading process.

Typical photosensitive material required for CD/CD ROM type optical data storage should have two stable, non degraded isomeric phases A (non fluorescent) and B(fluorescent). By absorbing the photon with frequency $v_w$ the molecule being in a phase A is irreversibly transferred to the phase B. The light absorption in a phase B results in a fluorescence at the longer wavelength. Typical absorption and fluorescence spectra for such photosensitive material having both, phase A and B, is shown in the FIG. 4.

The writing process can be provided either by one photon absorption at the 400–440 nm wavelength or by two-photon absorption at the 800–880 nm wavelength and irreversible chemical conversion to the phase B. The reading process is achieved by illuminating the written sites by laser beam at the 620–680 nm wavelength and the fluorescence detection at the 670–730 nm. Typical values for extinction coefficients $\Sigma_{A,B} \sim 6000$–10000 mol/ltr cm, the quantum yield for A→B chemical conversion is $q_A \sim 0.2$, and for the phase B fluorescence is $q_B \sim 0.5$ The concentration of the photosensitive compound in the plastic substrate can reach $C_{A} \sim 0.1$–0.3 mol/ltr. There is well known wide group of photosensitive materials, possessing such parameters.

According to the first embodiment of the present invention the apparatus for multilayer optical data storage reading, and multilayer disk structure provide the reading laser intensity as well as the readout signal to have substantially the same value independent on the position in depth of the data layer being readout.

As it was already mentioned the multilayer disk structure provides thin 0.5–1 -micron information layers filled with fluorescent cells, occupying only k=10–20% of whole layer area (k-cells filling factor), with absorption coefficient about 10–20%, whereas the rest is completely transparent for reading laser. Such a disk structure provides about 10% of reading light absorption on the addressed layer and only 1–2% losses Eq.4 on the non addressed layer. Therefore, the reading laser intensity achieving, for example, the 20th layer, will have only factor of 2 reduction as compare with the intensity at the first layer. It follows that the detected signal value which is linearly proportional to the reading laser intensity will also be independent on the depth of readout layer. This provides a substantial advantage over all existed multilayer disk structures and enables to solve at least four of main drawbacks mentioned in the Background of the Invention. Moreover, since the multilayer disk structure and manufacturing technology described elsewhere does not require areas or layers with different refractive index value it allows to overcome or at least simplify the spherical aberration problem. Actually all materials used for multilayer disk formation have the same or slightly different refractive index: polycarbonate, PMMA, PVA, PVB, etc. Therefore it substantially simplifies the problem and requires the standard and wellknown procedure to compensate spherical aberrations in a thick uniform plane substrate.

According to the second embodiment of the present invention the optical pickup for multilayer fluorescent disc reading is demonstrated in the FIGS. 1 and 2. The circulazed and collimated radiation from the CW diode laser at 620–680 nm, 3–5 mW power is directed by the steering mirror and focused by the objective lens to the arbitrary layer within the multilayer disc. The focus replacement from one layer to another is provided by implementing the conventional CD ROM pickup objective lens servo mechanism, which controls focusing errors and enables lens translation along z-axis within 1–3 mm.

The fluorescence light induced by the reading laser illumination of recorded cells is collected by the same objective lens and through the dichrioc mirror, is delivered to the photo diode detector.

In contrast to the Rentzepis approach [5,6], our method of medium excitation by using the only one focused laser beam excites simultaneously huge amount of fluorescent cells in a whole volume confined within the conical surfaces (FIG. 3). Therefore the reading of single bit of information from the isolated pit is provided at the detection stage.

First method to select the signal from huge background noise is based on a different modulation frequency of the fluorescent light coming from different layers, FIG. 3. The CW laser illumination of the rotated optical disc results in an amplitude modulation of the fluorescence output. However, the characteristic modulation frequency is realized to be different for different layers and is determined by the distance between layer. While at the in-focus layer the micron sized shift of the disc position will result in 100% amplitude modulation, at the adjacent layer the same shift will make negligible change in the fluorescence output. It happens because at the in-focus layer the diffraction-limited laser spot illuminates the only single pit, while at the adjacent layer the laser spot size is 60 $\mu$m and it simultaneously covers about 3600 cells. At the micron-sized shift of the laser spot position the only small amount of new cells ~60 cells will appear inside the laser spot size. Another words, the modulation frequency value of fluorescence light coming from out-of-focus layer is 60 times lower than the same one for the light coming from in-focus layer. This ratio permits to provide good filtration of the detected signal to read the information only from the single pit.

Supposing the distribution of the fluorescent and non fluorescent pit position at the 2-D layer surface one can estimate the pit number deviation and signal modulation depth at the adjacent layer as $$\delta N = \sqrt{N} \approx 8; \quad \delta I/I = \sqrt{N}/N^2 \approx 2 \cdot 10^{-3}; \tag{12}$$

Taking into account the layer filling rate k=0.2 (the surface covered by fluorescent pit with respect to whole surface) and the noise value accumulated from all out-of-focus layers one can determine the detected carrier-to-noise ratio $$C/N = [k\Sigma \delta I_m/I_m]^{-1} = [1.5 k \delta I/I]^{-1} \approx 1.6 \cdot 10^3 \approx 30 \text{ db}; \tag{13}$$

In addition to the photo diode electronic signal filtration further signal extraction and S/N ratio improvement can be provided by spatial separation of the light coming from different layers. In order to make such spatial selection the additional imaging lens and confocal pinhole[6] should be inserted in front of photo diode, FIG. 2.

The aperture is positioned exactly at the plane which conjugates to the light source plane. When the reading beam is precisely focused on the active layer surface ±1 $\mu$m, the image size of the fluorescent site at the focal plane of the image lens is about $d_0$–the illuminated site at the layer. The illuminated site size at the adjacent layer will be about (s=50 $\mu$m–distance between active layers, b=2.5 $d_0$–waist confocal parameter), FIG. 3

$$d(s) = 2d_0 s/b = 2s \text{ NA} = 60 \ \mu m; \tag{14}$$

Thus, the aperture with diameter 1–2 $\mu$m placed at the focal plane of the image lens will transmit all light from the point at the desired layer and cut-off the light from the adjacent layer with a factor $10^{-4}$, providing the negligible cross talk between the adjacent layers. The specially designed four part PD will provide simultaneously the detection of the focusing and tracking error signals. In order to fulfill the whole PD surface it should be placed about 100–200 $\mu$m below the image lens focal plane. The fluorescence wavelength separation from the reading laser wavelength is simply achieved by dichroic mirror implementation. The absence of strong back reflection requires no polarizer and retardation plate to protect the diode laser. Due to such substantial simplification the optical pickup for the multilayer fluorescent disc can compete in construction simplicity and price with matured and well developed optical pickups for conventional CD/CD ROM disc based on the reflected signal measurement.

Another embodiment of the present invention describes the optical means which can provide the focusing and tracking error correction (FEC/TEC) suitable for substantially transparent multilayer fluorescent optical disk.

In order to provide the focusing and tracking error correction (FEC/TEC) for conventional 2-D CD the optical disk should have specially prepared land/groove relief The information is recorded in a form of cells on the groove surface. Since all different approaches for tracking error correction like three beam, diffraction or phase techniques are based on the interference of the reflected light, there is a strong requirement on the difference in the depth between land and groove as well as between groove and cells, which is 0.1 $\mu$m and should be precisely provided by the recording procedure. The reflection of two side beams focused on the pregrooved tracks provide the tracking error correction while a central reflected beam is utilized for focusing error correction and data sampling.

Figure 7:
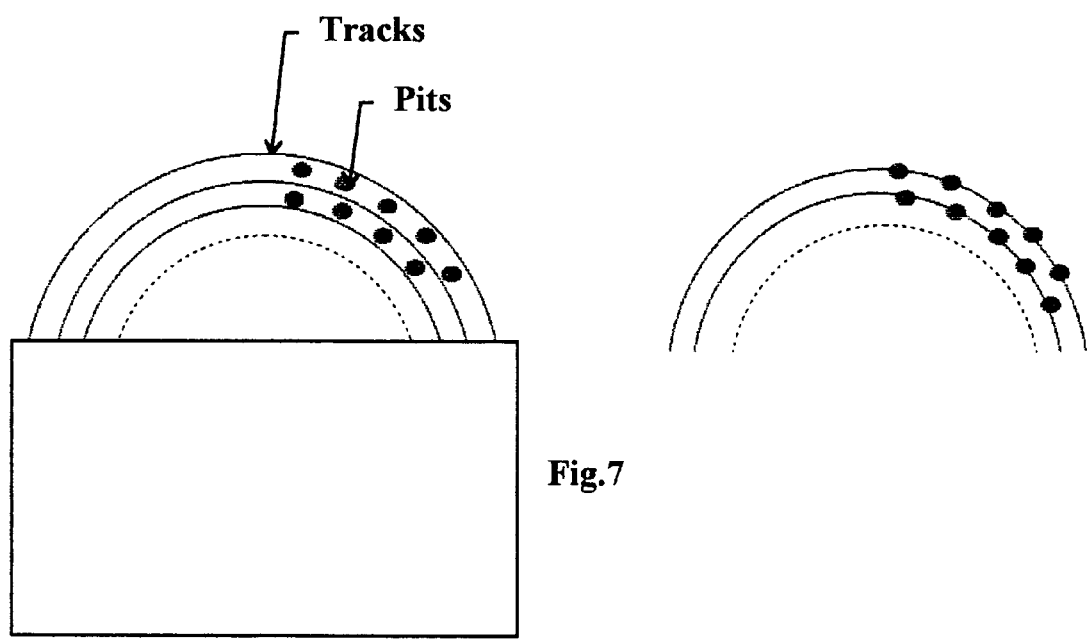
FIG. 7 is the view of active layer surface with the preferred position of recorded track lines and cells. a) cells are recorded between continuous track lines; b) cells are recorded at the track lines.

The FEC/TEC system for multilayer fluorescent disc should be substantially different, first because the disk is transparent and has no reflective layer supporting FEC/TEC system. The multilayer disk structure schematically shown in the FIG. 3, contains the number of 1–2 $\mu$m thickness active layers separated by the transparent polymer layers with 50–100 $\mu$m thickness. Each active layer has the recorded information in a form of $\mu$m-sized cells on or between the spiral track lines, FIG. 7. Since the information and space layer can be made of the same polymers with the refractive index very close to the refractive index of polycarbonate substrate it substantially reduces the reading laser reflection and does not allow to use it as feedback for FEC/TEC system.

The signal now is represented by the reading laser induced fluorescence from the recorded cells. The FEC/TEC system is also using the same fluorescence light instead of reflected one and requires neither land/groove structure nor beam splitting technique. The servo mechanism requirements can be substantially simplified (1–2 $\mu$m accuracy instead of 0.1 $\mu$m). The same servo mechanism can be used to move the focused beam position to the desired layer.

Figure 5:
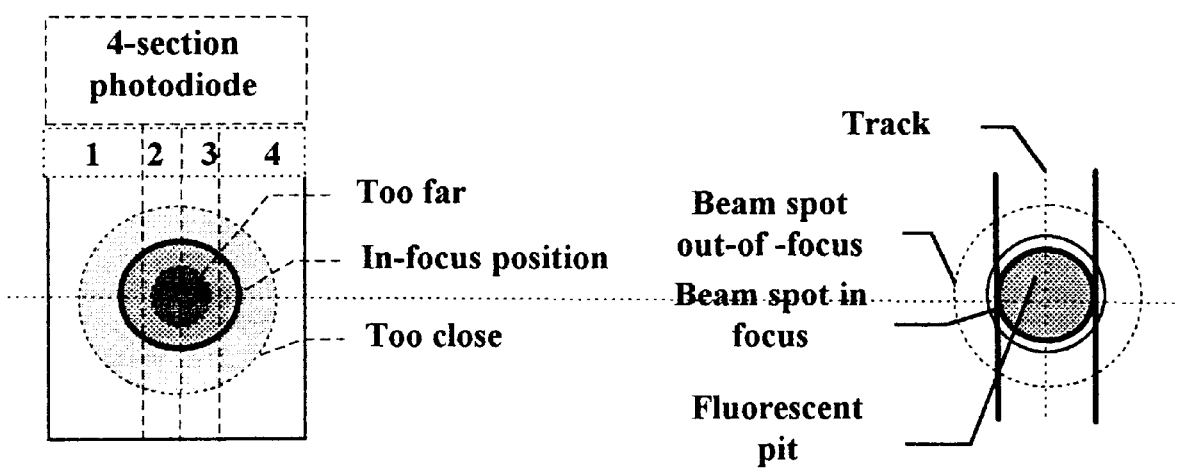
FIG. 5 is the cross-sectional view of signal image on the surface of linear photo diode array (4-section photo diode) and description of auto focusing system operation for multilayer fluorescent disc.
Figure 6:
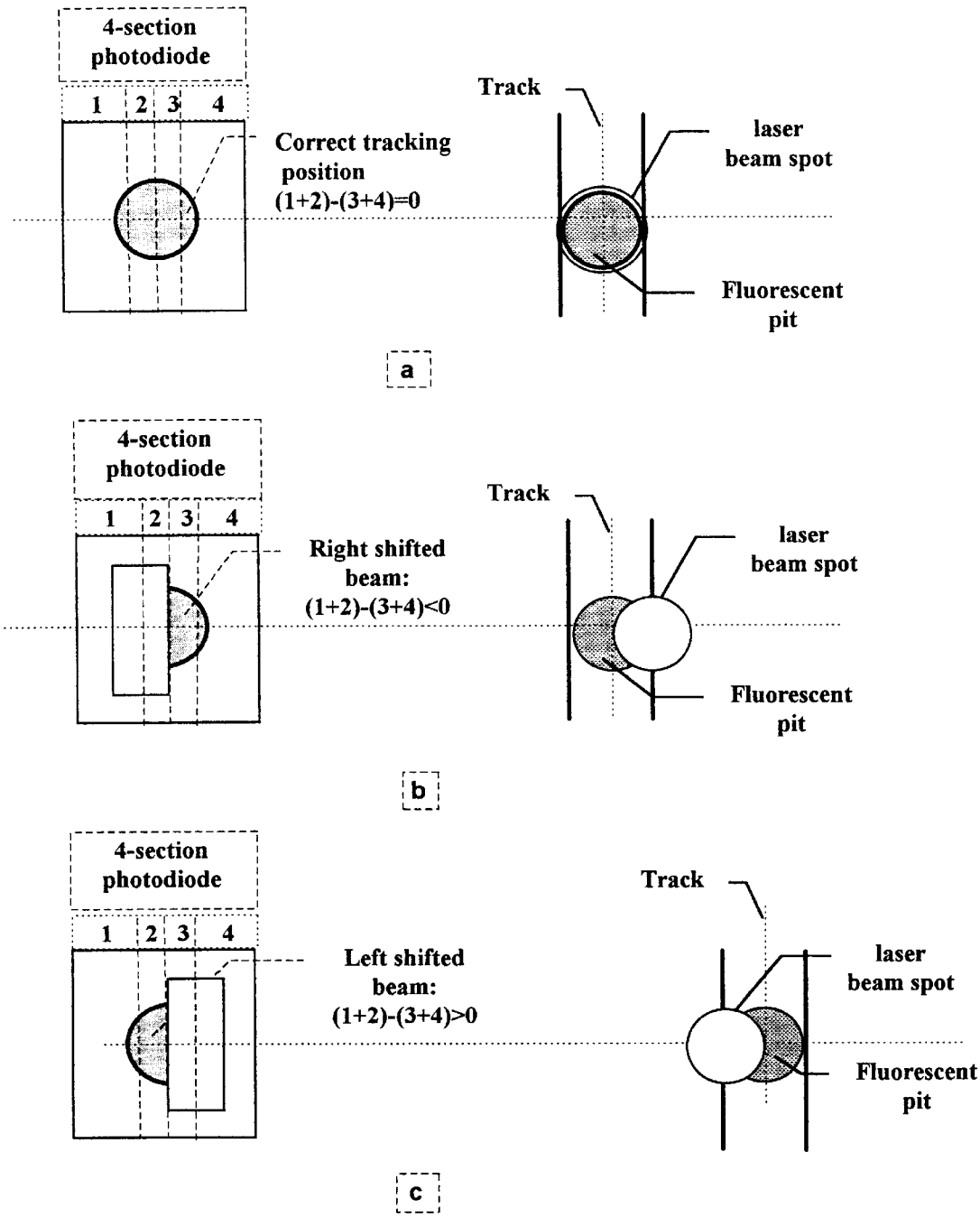
FIG. 6 is the cross-sectional view of signal image on the surface of linear photo diode array (4-section photo diode) and description of auto tracking system operation for multilayer fluorescent disc.

There are several schemes which can carry out those goals One of such approach is shown in the FIGS. 5, 6. The measurements implementing 4-section photo diode permit simultaneous FEC/TEC as well as data signal detection by utilizing the only one beam approach.

In order to determine the focus position with respect to the layer position and drive z-axis servo mechanism the FEC signal should be measured by specially designed PD split into four parts. When the laser beam is focused exactly at the layer surface the differential signal from 4-section PD ($S_i$ is the detected signal from each separate PD part).

$$S_{FEC} = (S_1 + S_4 - S_2 - S_3)/(S_1 + S_4 + S_2 + S_3); \tag{15}$$

is aligned to be zero. When the distance between the illuminated layer and the objective lens is shorter then the lens focus the laser spot size becomes larger then the pit size. The fluorescence pit spot size remains unchanged. However, since the fluorescence light source position is now shorter then the focal length, it's image spot size at the PD will be increased, resulting a positive differential signal, $S_{FEC}>0$. When the distance between the illuminated layer and objective lens is longer then the lens focus the laser spot size again becomes larger then the pit size. In this case the fluorescence light source position is larger then the focal length. Thus, the fluorescence pit image size at the PD will be smaller then at the in-focus case, resulting in negative differential signal $S_{FEC}<0$, FIG. 5.

For tracking system alignment the differential signal should be, FIG. 6

$$S_{TEC}=(S_1+S_2-S_3-S_4)/(S_1+S_4 30\ S_2+S_3); \qquad (16)$$

When the laser spot is positioned exactly at the track center, FIG. 6a, the fluorescent pit image is positioned at the center of the PD, thus the tracking differential signal is zero. It is clearly seen from the FIG. 6, that when the track position is right/left shifted towards to the laser spot the image position remains unchanged at the PD plane. In this case, however, the only some part of fluorescent pit is illuminated, resulting in a light redistribution at the PD plane and differential signal appearance. When the track is left shifted, FIG. 6b, the differential signal becomes negative, $S_{TEC}<0$. In the opposite case, FIG. 6c, the differential signal becomes positive, $S_{TEC}>0$. The data signal is simply the sum of four separate signals $$S_D=S_1+S_2+S_3+S_4; \qquad (17)$$

The required detection system parameters—sensitivity, bandwidth, etc. can now be easily estimated. Suppose the CW diode laser power at 650–680 nm is 1 mW, the material fluorescence quantum yield is better than 0.5 and light collection system efficiency is 0.1. The signal detected by PD is expected to be about 5 $\mu$W, the signal sampling channel bandwidth should be 1–10 MHz. These parameters are typical for any cheap silicon photo diode and do not require special and costly APD or PMT photon-counting devices. For the FEC/TEC system we can sample the data at much lower frequency, 10 KHz for instance, which will substantially increase the servo system feedback electrical signal, thus improve and simplify the FEC/TEC system parameters.

Accordingly, the scope of present invention should be determined by the following claims, only, and not solely in terms of that preferred embodiment within which the invention has been taught.

What is claimed is:

1. A device for fluorescent optical storage reading using single photon single beam excitation which includes a thin fluorescent information layer on a substrate having substantially reduced reflectivity, a diffraction limited source of reading radiation, a detector of fluorescent radiation, an optical system for projection of the reading radiation into a diffraction limited spot at an addressed area of information layer, an optical system for projection of a fluorescent pattern of the addressed area of information layer onto the detector of fluorescent radiation in the opposite direction to the reading radiation propagation direction, where a spectral filter which is not transparent for reading radiation is placed between the information layer and the detector.

2. The device according to claim 1, where fluorescent optical storage includes many information layers of the same fluorescent material which are separated by transparent spacing layers, and fluorescent layers are substantially transparent, preferably having layer absorption in the range of 1–20%.

3. The device according to claim 1, where reading device includes means for increasing absorption of the reading radiation in the addressed layer up to 10–50%.

4. The device according to claim 1, where a ratio of a reading spot diameter to a width of fluorescent cells is less than a ratio of a layer area to a total area of the fluorescent cells.

5. The device as in claim 1, where means for selecting an addressed part of the fluorescent pattern from non addressed layers are utilized.

6. The device as in claim 1, where a confocal aperture is inserted in front of the detector of fluorescence, to cut out the fluorescence coming from non addressed layers.

7. The device according to claim 1, where reading device includes means for providing high frequency modulation for a fluorescent signal from the addressed layer and a low frequency modulation for fluorescent noise coming from non addressed layers.

8. The device as in claim 1, including electronic signal filtration means for reducing a low frequency component of a fluorescent signal coming from non addressed layers and increases the signal-to-noise ratio.

9. The device as in claim 1, including both an electronic signal filtration, means for reducing a low frequency component of a fluorescence signal coming from non addressed layers and increase the signal-to-noise ratio, and a confocal aperture in front of the detector, to reduce the fluorescence coming from the non-addressed layers.

10. The device as in claim 1, including a coherent light source, preferably CW diode laser at 620–680 nm, an objective lens to focus the reading light into the diffraction limited spot at the surface of the addressed active layer, a steering motor to correct the beam tracking errors by movement of the objective lens, dichroic mirror or filter to separate the scattered laser light from a fluorescence signal and a linear array of photo diodes to detect the data and the auto focusing/auto tracking error signals, where the dichroic mirror or filter are placed between the addressed layer and the linear array of photo diodes.

11. The device as in claim 1, including multilayer fluorescent optical storage, where tracks are recorded at the layer surface in a form of continuous fluorescent lines and information pits are placed between the tracks.

12. The device as in claim 11, including a system for auto focusing/auto tracking error correction which utilizes the fluorescence from the continuous fluorescent track lines as a feedback signal.

13. The device as in claim 1, where fluorescent optical storage is in the form of disc, tape, card or cylinder.

14. A device for fluorescent optical storage reading using single photon single beam excitation, which includes a thin fluorescent information layer on a substrate having substantially reduced reflectivity, a diffraction limited source of reading radiation, a detector of fluorescent radiation, an optical system for projection of the reading radiation into a diffraction limited spot at an addressed area of information layer, an optical system for projection of a fluorescent pattern of the addressed area of information layer onto the detector of fluorescent radiation in the opposite direction to the reading radiation propagation direction, where means for tracking and focusing errors corrections are based on fluorescent signals utilization.

15. The device according claim 14, where fluorescent optical storage includes many information layers of the same fluorescent material which are separated by transparent spacing layers, and fluorescent layers are substantially transparent, preferably having layer absorption in the range of 1%–20%.

16. The device as in claim 14, where means for tracking and focusing errors corrections includes linear photo diode array, and a fluorescent image of fluorescent cell of the addressed layer is projected onto 4 adjacent photo diodes of the linear photo diode array.

17. The device as in claim 16, where the means for tracking and focusing error corrections utilizes the fluorescence light from the fluorescent cell as a feedback signal.

18. The device as in claim 14, including multilayer fluorescent optical storage, where tracks are recorded at the layer surface in a form of continuous fluorescent lines and information cells are recorded exactly at the track lines.

19. The device as in claim 14, where fluorescent optical storage is in the form of a disc, tape or a card or cylinder.

* * * * *